US010817211B2

United States Patent
Casperson et al.

(10) Patent No.: US 10,817,211 B2
(45) Date of Patent: Oct. 27, 2020

(54) METHOD FOR COMPLETING A SECURE ERASE OPERATION

(71) Applicant: Ensconce Data Technology, LLC, Portsmouth, NH (US)

(72) Inventors: Daniel H. Casperson, Portsmouth, NH (US); David Christopher Mackensen, Temple, NH (US)

(73) Assignee: Ensconce Data Technology, LLC, Portsmouth, NH (US)

( * ) Notice: Subject to any disclaimer, the term of this patent is extended or adjusted under 35 U.S.C. 154(b) by 0 days.

(21) Appl. No.: 14/694,685

(22) Filed: Apr. 23, 2015

(65) Prior Publication Data

US 2015/0309925 A1    Oct. 29, 2015

Related U.S. Application Data

(60) Provisional application No. 61/983,430, filed on Apr. 23, 2014.

(51) Int. Cl.
*G06F 3/06* (2006.01)
*G06F 21/80* (2013.01)
(Continued)

(52) U.S. Cl.
CPC .............. *G06F 3/0652* (2013.01); *G06F 1/24* (2013.01); *G06F 3/062* (2013.01); *G06F 3/0676* (2013.01);
(Continued)

(58) Field of Classification Search
CPC ........... G06F 2221/2143; G06F 3/0652; G06F 3/0676; G06F 12/0246; G06F 2212/7205
See application file for complete search history.

(56) References Cited

U.S. PATENT DOCUMENTS

| | | | | |
|---|---|---|---|---|
| 5,621,687 A | * | 4/1997 | Doller | G11C 16/10 365/185.14 |
| 2002/0133702 A1 | * | 9/2002 | Stevens | G06F 9/4418 713/163 |

(Continued)

FOREIGN PATENT DOCUMENTS

| | | |
|---|---|---|
| CN | 1673922 A | 9/2005 |
| CN | 101290557 A | 10/2008 |

(Continued)

OTHER PUBLICATIONS rmprepusb.com, Securely Erase (wipe) your hard disk of all data (before depositing it), Dec. 19th, 2012, Internet Archive: Wayback Machine, https://web.archive.org/web/20121219015857/http://www.rmprepusb.com/tutorials/erase-your-hard-disk.*

(Continued)

*Primary Examiner* — Reginald G Bragdon
*Assistant Examiner* — Thanh D Vo
(74) *Attorney, Agent, or Firm* — Wolf, Greenfield & Sacks, P.C.

(57) ABSTRACT

A system that may reliably erase a storage device, such as a solid state drive. The system issues an erasure command to the storage device. Such a command may be issued over a bus connecting a processing unit to one or more storage devices to be erased. The system, including the storage device, may be prepared for the erasure operation via performing one or more operations. Those operations may include: using hardware of the system to initiate a hard reset of the storage device; preventing access to the storage device while the erasure operation is being performed; and/or erasing hidden areas on the storage device. The system may be configured to perform the hard reset and may be configured not to alter a command to perform secure erase. Further, the erasure process may include writing a signature to (Continued)

certain areas of the storage device to confirm that erasure was performed.

17 Claims, 6 Drawing Sheets

(51) Int. Cl.
  *G06F 1/24* (2006.01)
  *G06F 12/02* (2006.01)
  *G06F 13/38* (2006.01)
(52) U.S. Cl.
  CPC ........ *G06F 12/0246* (2013.01); *G06F 13/382* (2013.01); *G06F 21/80* (2013.01); *G06F 2212/7205* (2013.01); *G06F 2221/2143* (2013.01)

(56) References Cited

U.S. PATENT DOCUMENTS

| | | | |
|---|---|---|---|
| 2004/0003167 A1* | 1/2004 | Kimura | G11C 16/10 711/103 |
| 2005/0105331 A1 | 5/2005 | Lee et al. | |
| 2005/0182951 A1 | 8/2005 | Sohn | |
| 2005/0216761 A1* | 9/2005 | Takada | G06F 21/606 726/22 |
| 2007/0180204 A1* | 8/2007 | Wilson | G11B 5/024 711/159 |
| 2008/0263274 A1* | 10/2008 | Kishi | G06F 3/0623 711/114 |
| 2009/0196100 A1 | 8/2009 | Merry, Jr. et al. | |
| 2010/0138588 A1 | 6/2010 | Lin et al. | |
| 2010/0325736 A1* | 12/2010 | Sadovsky | H04L 63/101 726/27 |
| 2011/0238901 A1 | 9/2011 | Koga et al. | |
| 2015/0121537 A1* | 4/2015 | Ellis | G06F 21/60 726/26 |
| 2015/0309925 A1 | 10/2015 | Casperson et al. | |

FOREIGN PATENT DOCUMENTS

| | | |
|---|---|---|
| CN | 101663652 A | 3/2010 |
| CN | 101968835 A | 2/2011 |
| CN | 102201049 A | 9/2011 |

OTHER PUBLICATIONS

CMRR, Erases all data on a hard disk drive—a freeware utility, Sep. 20, 2008, University of California San Diego, version 4.0. (Year: 2008).*

Curtis E. Stevens, Information technology—ATA/ATAPI Command Set—2 (ACS-2), Aug. 3, 2009, American National Standards Institute, Revision 2, pp. 26-44 and 60-72. (Year: 2009).*

PCT International Search Report and Written Opinion from International Application No. PCT/US2015/027242, dated Jul. 24, 2015, 12 pages.

https://web.archive.org/web/20130831165909/https://ata.wiki.kernel.org/index.php/ATA_Secure_Erase , ATA Secure Erase—ata Wiki, Internet Archive waybackmachine, May 31, 2009-Oct. 17, 2015, pp. 1-5.

* cited by examiner

METHOD FOR COMPLETING A SECURE ERASE OPERATION

RELATED APPLICATIONS

This application claims the benefit under 35 U.S.C. § 119(e) of U.S. Provisional Patent Application Ser. No. 61/983,430, entitled "METHOD FOR COMPLETING A SECURE ERASE OPERATION," filed Apr. 23, 2014, which is incorporated herein by reference in its entirety.

BACKGROUND

Computer and data security are important concerns for individuals, businesses and governments. Particularly, secure techniques for erasing or otherwise disposing of electronically stored data are growing concerns. U.S. Pat. No. 7,725,674 and U.S. Patent Application Publication No. 2004/0252628, which are commonly assigned to Ensconce Data Technology, Inc. and are incorporated herein by reference, describe the importance of secure data destruction for individuals, businesses, and governments. Legislation has also pushed the importance of data security to the forefront. To comply with federal regulations, companies now need to completely and reliably eliminate all sensitive data on hard drives prior to disposing of or reusing the drive. Specifically provisions of the Financial Services Modernization Act (2003) (Gramm-Leach-Bliley), the Fair and Accurate Credit Transaction Act of 2003 (FACT Act), the Corporate and Criminal Fraud Accountability Act of 2002 (Sarbanes-Oxley), and the Health Insurance Portability and Accountability Act (HIPPA) all contain data security requirements. The regulations under these acts set requirements for securely handling sensitive data.

In response to the increasing need for computer and data security, techniques for erasing or destroying electronically stored data have been developed. One such development is data eraser software, which is intended to make deleted files unrecoverable as well as eliminate the extraneous data that is created and stored by many applications, especially those involving the Internet. Such software is run on the computer containing the hard drive that stores the information to be deleted. The software causes an over-write of certain data on the hard drive.

Moreover, various storage devices such as solid state hard drives (SSD) have become important. The Advanced Technology Attachment (ATA) specification defines a Secure Erase (SE) feature for hard drives, including SSDs, that can assist in erasing data such that the data is unrecoverable by known forensic data recovery techniques.

SUMMARY

Techniques for securely erasing a storage device, such as a solid state drive, may be implemented using a secure erase command in conjunction with one or more operations before, during, or after the secure erase command is executed. These operations may include precluding access to storage device during execution of the secure erase command, such as by seizing a bus used to access the storage device. Other operations described herein include performing a hardware reset of the storage device before erase and erasing hidden areas on the storage device. Also, a signature may be written to a portion of the storage device and used after execution of the secure erase command to confirm that erasure was successfully implemented.

Accordingly, certain inventive aspects may be embodied as a system for securely erasing storage devices, computer executable instructions to control all or a portion of the operation of the device, and/or a method of securely erasing a storage device.

The foregoing is a non-limiting summary of the invention, which is defined by the attached claims. It should be appreciated that the acts described and claimed herein may be used in other combinations, even if not expressly recited in those combinations the attached claims. In particular, acts recited in two or more dependent claims may be used together in a system or method of erasing a storage device without the acts recited in the independent claims from which those claims depend.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
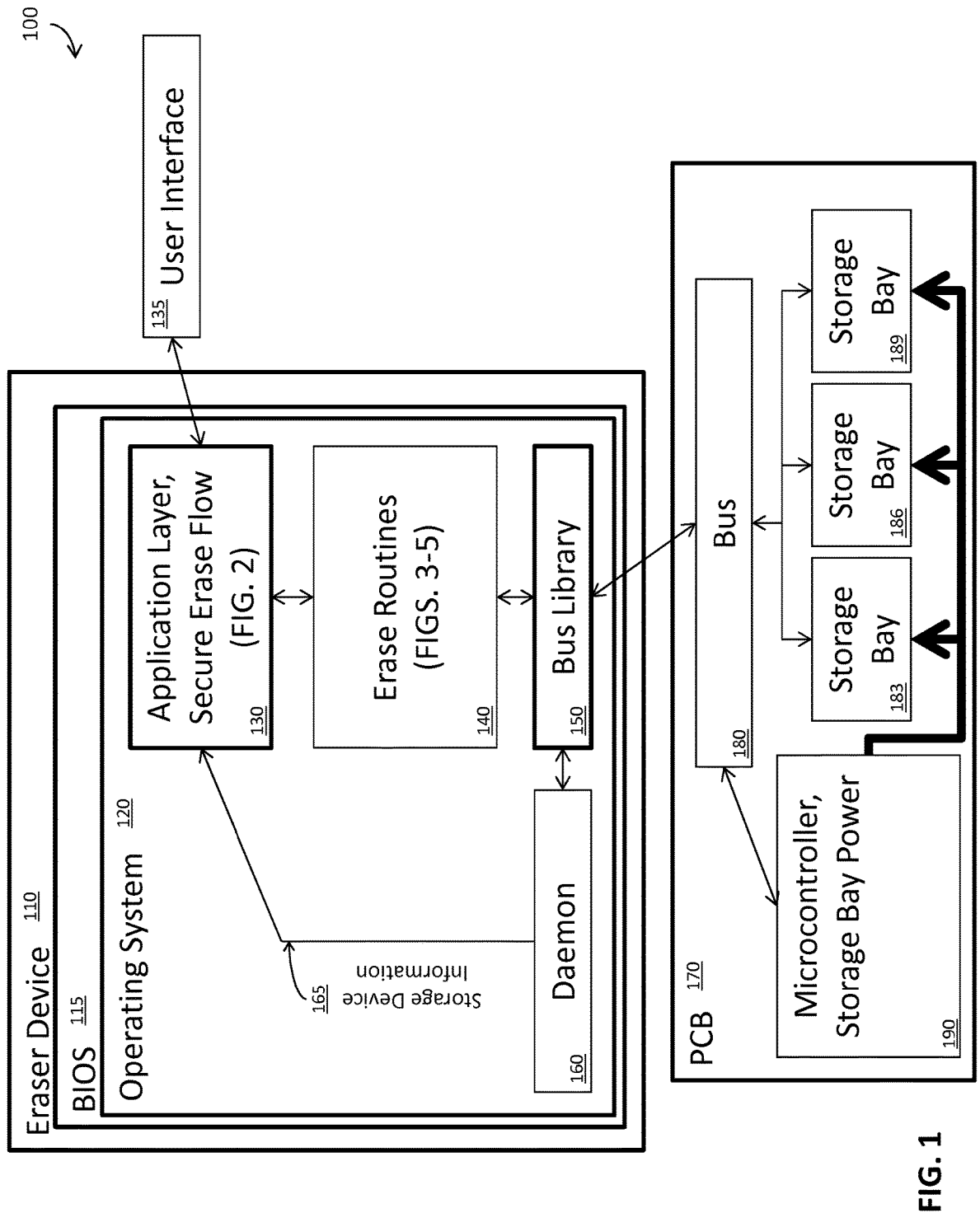
FIG. 1 is block diagram of an exemplary system with which some embodiments may operate.

Standardized Secure Erase (SE) may not perform as intended in all circumstances for all hard drives. The inventors have recognized and appreciated advantages of using SE, with an acceptable degree of reliability, may be achieved, particularly with solid state drives (SSDs), when the method and/or apparatus used in performing the SE meet one or more criterion. Such an approach may have a reliability at least as good as using sector overwrites, but may be much faster. Because no data must be pushed across a bus, the process of erasure operates at whatever speed the hard drive is capable of performing. In the case of SSDs, this means erasure times of minutes for capacities as high as 64 or 128 gigabytes.

The inventors have recognized and appreciated that a SE operation on a hard drive, especially a SSD, may not produce a complete erasure because of inconsistent implementation of the ATA specification among hard drive manufacturers and other issues, including reliance on system calls that do not execute as expected. The inventors have recognized and appreciated that a way to ensure reliable execution of the SE operation may involve taking one or more specific steps, as described in greater detail herein, before initiating a SE operation and/or using a particular configuration. The techniques as described herein may improve the effectiveness of the SE operation and enable the SE operation to be performed successfully on various hard drive types over a bus, specifically a Universal Serial Bus (USB).

Approaches for performing a SE operation traditionally have involved relying on the ATA specification and system calls to perform a SE operation. With such an approach, software might send system calls through an operating system and/or a basic input/output system (BIOS) to begin the process on a hard drive attached to the computer system running the operating system and the software.

The inventors have recognized and appreciated that such an approach may not result in a reliable erasure for one or more reasons. For example, such an approach may leave the hard drive accessible to the operating system for housekeeping operations while the SE operation is in progress. If the operating system does initiate some housekeeping operations while the hard drive is unresponsive during the SE operation, the operating system may interrupt the hard drive during the erasure operation. Such an interruption may leave the hard drive in an unpredictable state and potentially cause permanent damage to the hard drive because it can neither operate in or recover from that unpredictable state. The risk of damage is especially high where the hard drive is connected via USB. Based on this insight, the inventors have recognized and appreciated that preventing access to the hard drive and/or the bus while executing the SE operation may enable success of the SE operation.

The inventors have further recognized and appreciated that a hard reset or power cycling of the hard drive before initiating the SE operation can enable success of the SE operation. Without this step, which the ATA specification does not require, the SE operation may fail for some hard drives.

Additionally, the inventors have recognized and appreciated that erasure of the host protected area (HPA) and/or device configuration overlay (DCO) of the hard drive may also enable the SE operation to succeed, in part because not doing so may leave data intact in these areas of the hard drive even after the SE operation is completed. This problem may leave a user with a false sense of security about the SE operation because the user may believe all data has been erased such that the data is unrecoverable by known forensic data recovery techniques, but in reality some data may remain, and the user may have no way of knowing that. The inventors have additionally recognized and appreciated that performing this erasure of the HPA and/or DCO before power cycling the hard drive may enable the SE operation to succeed. Accordingly, the inventors have recognized and appreciated that power cycling beyond that called for by the ATA specification may promote effective erasure of a storage device.

Also related to user awareness, the inventors have recognized and appreciated that verification-based feedback to a user regarding the results of the operation may enhance the confidence of the user in the success of the SE operation. Without this verification-based feedback, the user may believe the operation was successful merely because it completed. Completion, however, may not be the same as success because some of the hard drive may not have been erased. In contrast, some traditional approaches may not provide any feedback to the user at all.

Moreover, the inventors have recognized and appreciated that specific BIOS characteristics may enable success of the SE operation. For example, a standard BIOS may remap a SE command issued to a hard drive to a Secure Freeze command, often for the purpose of preventing malicious code from initiating a SE operation on the hard drive. The result is that non-malicious code, particularly that intended to erase the hard drive using SE, may also be unable to initiate a SE operation under such a standard BIOS.

In accordance with some embodiments described herein, a system or method adapted to apply one or more of the techniques described herein may be used to complete a SE operation. The inventors have recognized and appreciated that performing a SE operation successfully can be accomplished even over a USB given the appropriate configuration and methodology. Such a configuration and methodology may include preparing for a SE operation and sending a SE signal from an eraser device over a bus, the bus connecting the eraser device to a storage device, which may be a hard drive, including a SSD, to initiate the SE operation. The SE signal may function at a hardware level of the storage device, which may be below the operating system level. Furthermore, the SE command(s) within the SE signal may remain unaltered by the BIOS of the eraser device. Preparing for the SE operation may include sending a hard reset signal to the storage device and preventing access to the storage device and/or the bus while executing the SE operation. The hard reset signal may be implemented by a device also on the bus, custom hardware (such as a microcontroller and storage bay power component 190), and/or prompting a user (such as by presenting instructions on a user interface) to physically/manually power cycle the storage device. The configuration and methodology may include accounting for the storage device being power cycled and then being reestablished and enumerated on the bus. Preparing for the SE operation may also include before sending the hard reset signal to the storage device, sending a hidden area (i.e., HPA and/or DCO) erase signal to the storage device. Finally, the configuration and methodology may include after preparing for the SE operation and before sending the SE signal, sending a write signal to the storage device to cause the storage device to write to locations on the storage device, and after sending the SE signal and completion of the SE operation, sending a read signal to the storage device to cause the storage device to read from the locations; and if the reading from the storage device represents an erased state of what was written at the locations, providing feedback to a user indicating success of the SE operation. One or more of these techniques may be applied in a system that may be configured to erase multiple hard drives concurrently.

FIG. 1 illustrates a storage device erase system 100 according to an exemplary embodiment. The system 100 may be a stand-alone system that provides secure erasure capability of storage devices, including hard drives such as SSDs. The system 100 may enable storage devices to be erased such that the data is forensically unrecoverable.

The system 100 may include an eraser device 110 capable of supporting a BIOS 115 and an operating system 120. For example, the eraser device 110 may be a personal computer, a server, a mobile device, or any other suitable device. The operating system 120 may be a Linux operating system, a Unix operating system, or any other suitable operating system. In some embodiments, the eraser device 110 may be programmed, using known programming techniques, to send commands to a printed circuit board (PCB) configured to interface with one or a plurality of storage devices. The PCB may be designed to interface to and control erasure operations on the storage devices, with circuitry to perform some or all of the functions described herein.

Figure 2:
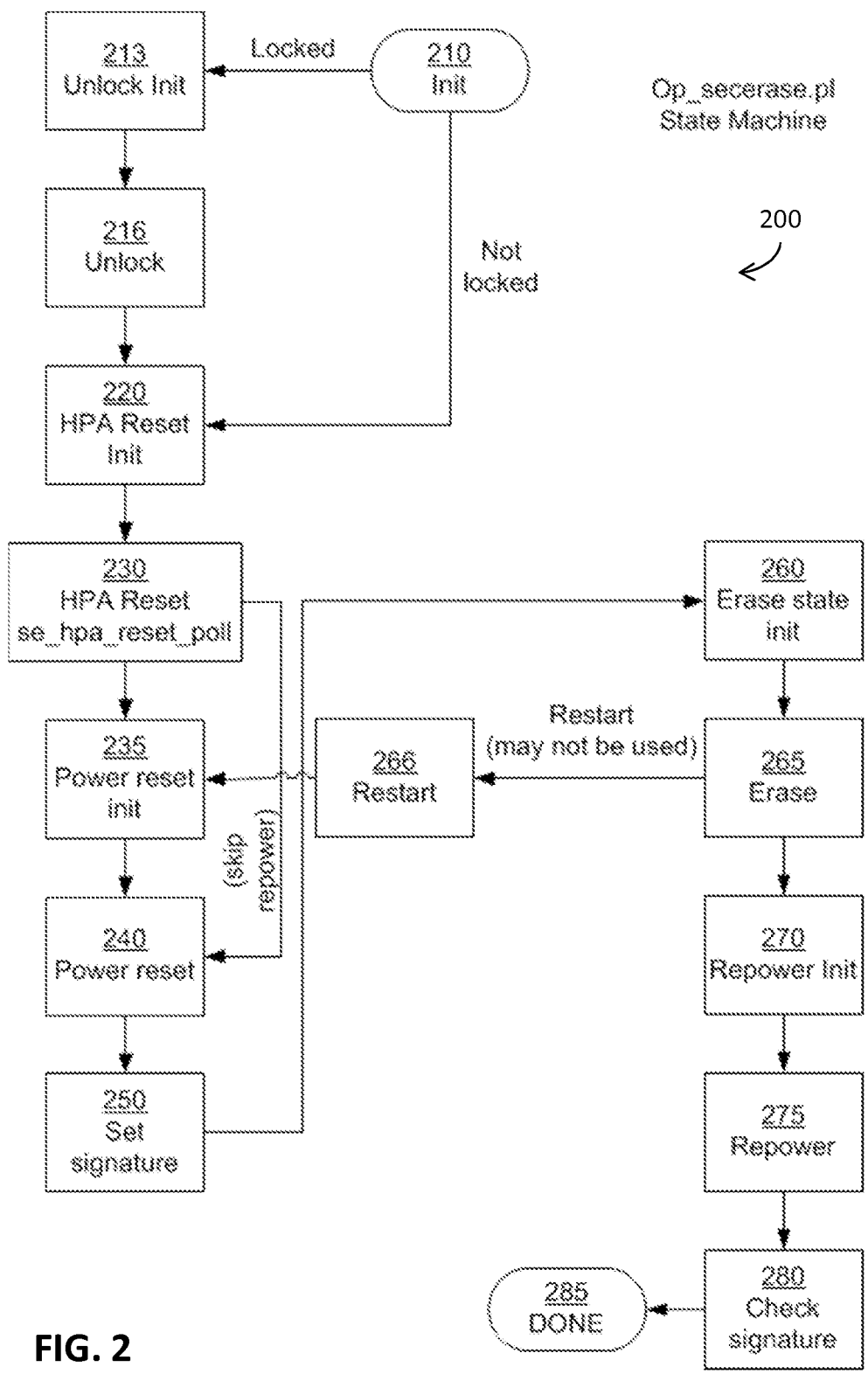
FIG. 2 is a flowchart of an exemplary technique that may be used in some embodiments.

The operating system 120 may support an application layer and programming to implement a secure erase flow 130, which are exemplarily illustrated in FIG. 2. Operating system 120 may further support a user interface 135, which may enable a user to input information into the system 100, including commands to erase one or more storage devices connected to system 100, and gain information from the system 100. Preferably, the user interface 135 may be a graphical user interface (GUI). The user interface 135 may be, for example, a display device and keyboard, a touch screen monitor, a voice interface, and/or any other suitable user interface.

The application layer and secure erase flow 130 may receive storage device information 165 from a daemon 160, which the operating system 120 may also support. The application layer and secure erase flow 130 may logically interface with erase routines 140, which are exemplarily illustrated in FIGS. 3-5 and which the operating system 120 may also support. The erase routines 140 and the daemon 160 may logically interface with a bus library 150, which the operating system 120 may also support. The bus library 150 may logically interface with a bus 180, which may be connected to and on a PCB 170.

The PCB 170 may be separate from the eraser device 110. However, it should be appreciated that the functionality of PCB 170 may be physically incorporated into the same housing as eraser device 110 or implemented in any other suitable way. The bus 180 may be connected to a microcontroller and storage bay power component 190, which may be connected to and/or on the PCB 170. The microcontroller and storage bay power component 190 may control and power any number of storage bays, such as storage bays 183, 186, and 189, which may be connected to the bus 180.

Each storage bay may be configured to receive at least one storage device (not shown). When inserted in a storage bay, the storage device may be erased using techniques as described herein. The storage devices may be any form of memory capable of storing data, including SSDs.

According to some embodiments, the eraser device 110 may cause data about each erase procedure to be stored on a storage device other than a storage device designated for erasure (not shown), which may be the same storage device storing the operating system 120 and/or application layer and secure erase flow 130, or it may be a separate storage device. In this manner, the system 100 may maintain a log of erase procedures. Data stored on this storage device may include any combination of the following: hard drive identification information, such as the hard drive serial number, manufacturer, model, and capacity; a start date/time stamp; an end date/time stamp; the erasure method; an indication of success or failure; the user who initiated the erase procedure; erase certificates; and any other suitable data.

The system 100 may support the erasure of multiple storage device simultaneously. The storage bays can support at least one type of storage devices, but they preferably may support multiple storage device types. Each storage bay optionally may include a locking mechanism (not shown) and a status indicator (not shown) for signaling the status of the storage device in the storage bay. The status indicator could be on the storage bay or displayed on the user interface 135.

Each storage bay may be operated independently of other storage bays, and individual storage device may be connected and disconnected from the storage bays without interfering with the operation of other storage bays. Accordingly, the user, or other mechanism, such as a robotic arm, may remove one storage device and connect another storage device without powering down the system 100 or interrupting an ongoing erase procedure. In this way, multiple storage devices may be erased rapidly in succession.

The storage bays may be configured for communication between one or more storage devices and the system 100 such that the system 100 can generate control signals that erase data contained on the storage device. Optionally, the system 100 may be configured such that the user can, by interaction with a user interface of system or otherwise controlling system 100, access (read and/or write) data on a storage device that is in a storage bay via the user interface 135.

Each storage bay may include at least one connecting device, such as a connector, port, cable, probe, or any device, mechanism, or means for establishing communication between the system 100 and a storage device. Such a means for establishing communication may be a standardized connector or otherwise configured in accordance with an industry standard. However, any suitable mechanism may be used. For example, in some embodiments, a drive bay 110 may include one or more cables (not shown) that may connect to a storage device, e.g., a data cable and a power cable. Other devices and means for providing communication between the system 100 and the storage device may alternatively or additionally be employed. The system 100 may accommodate different storage device types that have differing connection requirements and/or different data storage technologies.

Additionally, a storage bay may include a probe, which may attach to a storage device at locations other than typical cable attachment locations. For example, the probe may connect to inject a signal to the printed circuit board of the storage device. Alternatively, the system 100 may be configured to communicate with the storage device in situ, i.e., as it is found in a particular device, such as a personal computer. It should be understood that the system 100 may include one or more storage bays and may be configured to connect directly to one or more storage device in situ.

According to some embodiments, the system 100 may be in communication with an output device (not shown) for outputting information, such as the status of storage devices and erase certificates, for example by printing, emailing, storing a record of the erasure operation in a computer database, or any other suitable output mechanism. The output may be in any suitable form, including a certificate or other evidence that the erasure was performed completely. According to some embodiments, for example, the output device may be a printer for printing certificates (e.g., in the form of labels) certifying that a particular storage devices has been erased. Alternatively or additionally, the output device may be integrated with the system 100.

According to some embodiments, the system 100 may be in communication with the Internet 151 or any other suitable network (not shown). Any input or output that may be provided directly through a user interface attached to system 100 may, in some embodiments, be provided over such a communication network. For example, the erase device 120 may be configured to provide erase certificates and logs to a remote device (not shown), such as a computer, which may be part of a network, which may be controlled by a third party independent of the system 100 user. According to some embodiments, the third party may receive erase certificates from a variety of sources, for example, from multiple systems 100, and may store the erase certificates. In this manner, the third party may keep data regarding storage device erasures that may be readily accessed as needed.

FIG. 2 is a flow chart of an exemplary technique that may be used in some embodiments for erasing a storage device using the system 100 (FIG. 1). The exemplary technique illustrated in FIG. 2 may be implemented by programming eraser device 110 at an application layer or at any other suitable layer. Execution of such programming, for example, may control eraser device 110 to generate control signals for hardware components with system 100 to erase one or more storage devices. It should be understood that the sequence of the steps described in connection with FIG. 2 may be altered and/or additional steps may be added.

Using the user interface 135, the user may begin an erase procedure described in more detail below. An erase procedure may begin at step 210, which may be triggered by user input or any other suitable trigger. For this, the user may install a storage device to be erased. Alternatively, the system 100 may be connected to the storage device in situ. However, it should be appreciated that an erasure procedure may be initiated in response to any suitable trigger, such as insertion of a storage device into a storage bay.

At step 213, the system 100 may initiate unlocking of the storage device. In step 216, the system 100 may complete unlocking of the storage device. These operations may be performed in any suitable way, including using standardized commands.

In step 220, the system 100 may initiate erasure of the HPA and/or DCO on the storage device. In step 230, the system 100 may complete erasure of the HPA and/or DCO on the storage device. In step 235, the system 100 may initiate the hard reset of the storage device. In doing so, the system 100 may notify the operating system 120, the bus library 150, the daemon 160, and/or any other suitable components that the storage device will "disappear" from the bus 180 when the hard reset begins. The system 100 may also command the bus library 150, daemon 160, and/or any other suitable components to re-enumerate the storage device with similar enumeration parameters as before the hard reset when it "re-appears" on the bus 180. The system 100 may do this without unlocking the storage bay lock. In step 240, the system 100 may complete the hard reset of the storage device. To do this, the eraser device 110 may send a hard reset signal to the storage device and/or to the microcontroller and storage bay power component 190 to perform the hard reset of the storage device. As with other operations, these operations may be performed by issuing commands to which the storage device itself, and/or elements of system 100, are configured to respond. In some embodiments, these areas of the storage device are erased in the order indicated.

In step 250, the system 100 may cause the storage device to write signature data to locations on the storage device. The signature data may have any suitable values. In some embodiments, the signature data may have a pattern that is unlikely to occur randomly, such that by checking for that pattern, a determination may be made as to whether the signature data is present or has been erased from the storage device. The signature data may be obtained in any suitable way. In some embodiments, the signature data may be stored in memory associated with the erasure device 110. Alternatively or additionally, the signature data may be generated algorithmically such as by execution of a program.

In step 260, the system 100 may initiate the SE operation on the storage device. To do this, the eraser device 110 may send a SE signal over the bus 180 to the storage device, which may execute the SE operation in step 265.

In some embodiments, in step 266, processing may return to step 235 and re-initiate the hard reset, then proceed to steps 240, 250, 260, and so on. A hard reset may be implemented in any suitable way. In some embodiments, the hard reset may, rather than being initiated by a command sent to the storage device being erased, be initiated by hardware elements. As one example, the hard reset may be initiated by microcontroller and storage bay power component 190 shutting off power to the storage device.

In step 270, the system 100 may initiate repowering of the storage device. In step 275, the system 100 may complete repowering of the storage device. These power off and power on operations may be performed as a result of the microcontroller and storage bay power component 190 responding to commands from erasure device 110 or in any other suitable way. In some embodiments, the system 100 may prompt a user to power cycle the storage device manually.

In step 280, the system 100 may cause the storage device to read data from the locations at which the signature data was written. If the data read from these locations represent an erased state of the signature data, the system 100 may provide output indicating success of the SE operation. This output may be provided via the user interface 135, the printer, and/or any other suitable way.

Alternatively, if the data read from these locations indicates that the signature data has not been erased, output may indicate an incomplete or unsuccessful erasure. In this scenario, system 100 may alternatively or additionally repeat the steps of FIG. 2 to attempt erasure again, or respond in any other suitable way.

In step 285, the system 100 may complete the erase procedure shown in FIG. 2.

Figure 3:
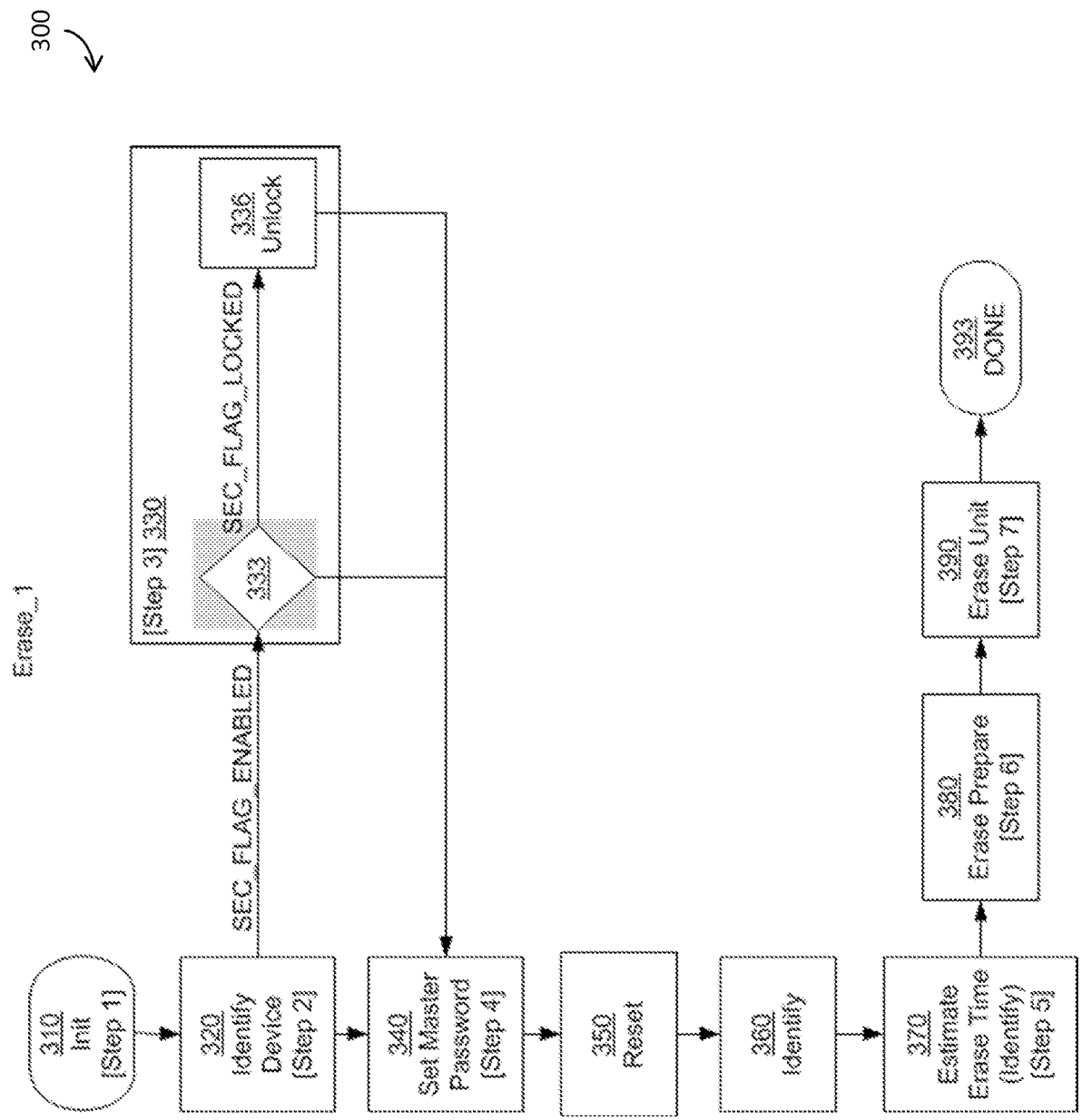
FIG. 3 is a flowchart of another exemplary technique that may be used in some embodiments.

FIG. 3 illustrates an exemplary technique that may be used in some embodiments for erasing a storage device using the system 100 (FIG. 1). It should be understood that the sequence of the steps described in connection with FIG. 3 may be altered and/or additional steps may be added. As with the other flowcharts illustrated herein, the processing illustrated in FIG. 3 may be performed under control of programming executing on a computerized erasure device 110 or in any other suitable way.

The erase procedure may begin at step 310. The erase procedure may be triggered in any suitable away. For example, using the user interface 135, the user may begin an erase procedure described in more detail below. For this, the user may install a storage device to be erased. Alternatively, the system 100 may be connected to the storage device in situ. At step 320, the system 100 may identify the storage device. If the SEC_FLAG_ENABLED condition is met, processing may proceed to step 330, which may begin at step 333. This condition may be determined using a known command to read state information from the storage device being erased, or in any other suitable way. Otherwise, processing may proceed to step 340.

In step 333, if the SEC_FLAG_LOCKED condition is met, processing may proceed to step 336. Otherwise, processing may proceed to step 340. In step 336, the system 100 may unlock the storage device. In step 340, the user may set the master password of the storage device using the user interface 135. As with other operations described herein, these operations may also be initiated by sending known commands to the storage device, such as over bus 180.

In step 350, the system 100 may perform a hard reset of the storage device. In step 360, the system 100 may identify the storage device. The hard reset may be performed using hardware components as described in connection with the embodiment of FIG. 2.

In step 370, the system 100 may estimate the erase time of the storage device. The system 100 may provide the estimated erase time to the user via the user interface 135. Alternatively or additionally, this information may be used in any other suitable way, including making a record of the erasure operation. According to some embodiments, the system may present control options via the user interface 135 such that the user may select whether to proceed with the erase procedure or cancel it. However, it should be appreciated that such information may alternatively or additionally be used as part of an automated control of system 100.

In step 380, the system 100 may prepare for the SE operation. This preparation may include preventing access to the storage device and/or the bus while the SE operation executes, performing an erasure of the HPA and/or DCO, and/or performing a hard reset of the storage device.

In step 390, the system 100 may initiate the SE operation on the storage device. To do this, the eraser device 110 may send a SE signal over the bus 180 to the storage device, which may execute the SE operation.

In step 393, the system 100 may complete the erase procedure shown in FIG. 3.

Figure 4:
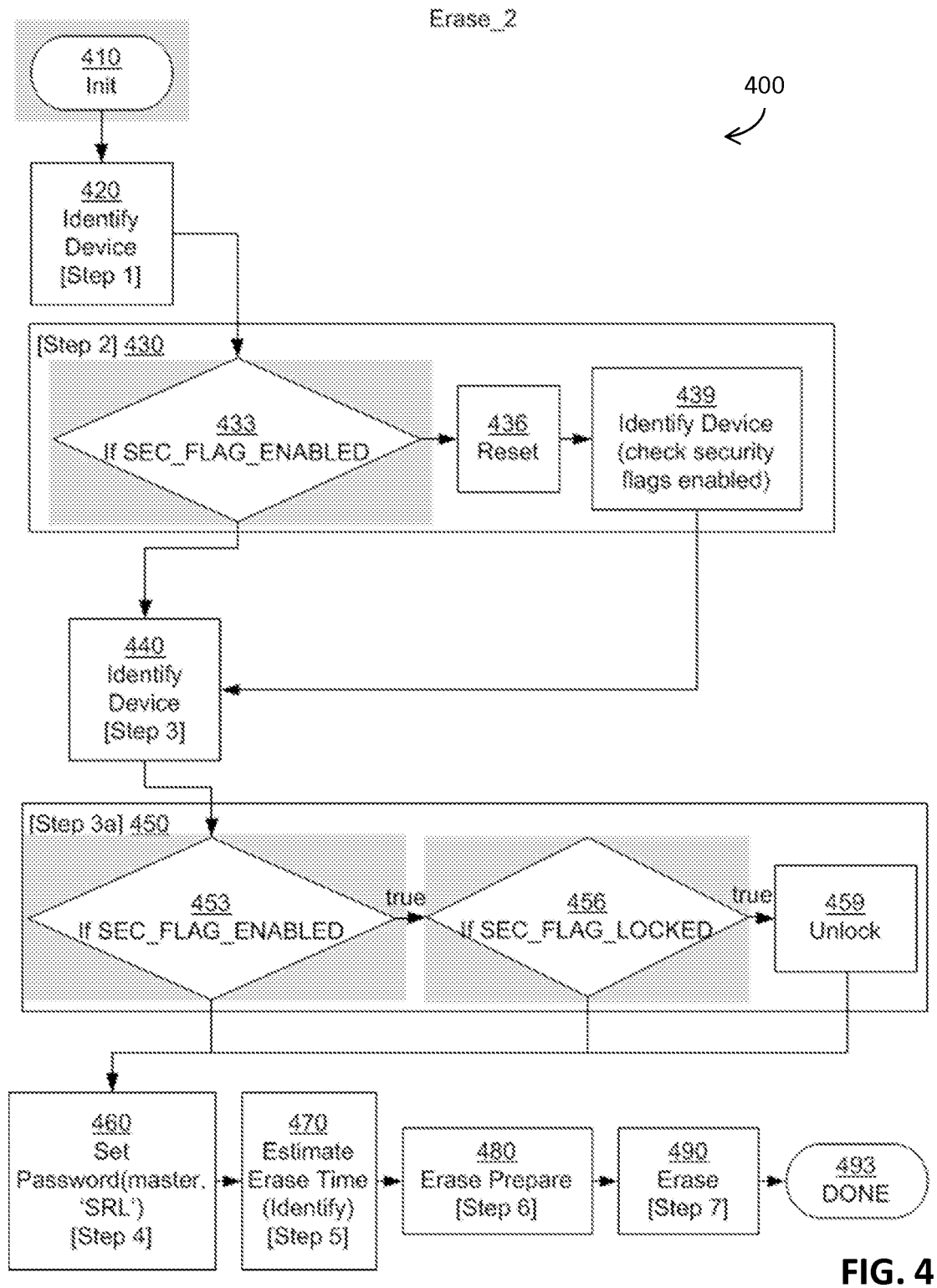
FIG. 4 is a flowchart of a further exemplary technique that may be used in some embodiments.

FIG. 4 illustrates an exemplary technique that may be used in some embodiments for erasing a storage device using a system such as system 100 (FIG. 1). It should be understood that the sequence of the steps described in connection with FIG. 4 may be altered and/or additional steps may be added. As with processing illustrated in FIGS. 2 and 3, the processing of FIG. 4 may be performed as a result of executing software on the erasure device 110 or in any other suitable way.

The erase procedure described in more detail below may be initiated in any suitable way, such as a user inputting commands through user interface 135. In this scenario, the user may begin an erase procedure at step 410. For this, the user may install a storage device to be erased. Alternatively, the system 100 may be connected to the storage device in situ. At step 420, the system 100 may identify the storage device. In step 430, which may begin at step 433, if the SEC_FLAG_ENABLED condition is met, processing may proceed to step 436. Otherwise, processing may proceed to step 440. In step 436, the system 100 may perform a hard reset of the storage device. In step 439, the system 100 may identify the storage device, checking whether security flags are enabled.

In step 440, the system 100 may identify the storage device.

In step 453, if the SEC_FLAG_ENABLED condition is met, processing may proceed to step 456. Otherwise, processing may proceed to step 460. In step 456, if the SEC_FLAG_LOCKED condition is met, processing may proceed to step 459. Otherwise, processing may proceed to step 460. In step 459, the system 100 may unlock the storage device.

In step 460, the master password of the storage device may be set. The password may be received from a user, such as via the user interface 135. However, it should be appreciated that the password may be determined in any suitable way, such as being generated randomly or being set to a predetermined default value.

In step 470, the system 100 may estimate the erase time of the storage device. The system 100 may provide the estimated erase time to the user via the user interface 135 or use the information in any other suitable way. According to some embodiments, the user may select whether to proceed with the erase procedure or cancel it via the user interface 135.

In step 480, the system 100 may prepare for the SE operation. This preparation may include preventing access to the storage device and/or the bus while the SE operation executes, performing an erasure of the HPA and/or DCO, and/or performing a hard reset of the storage device. In some embodiments, these areas of the storage device are erased in the order indicated.

In step 490, the system 100 may initiate the SE operation on the storage device. To do this, the eraser device 110 may send a SE signal over the bus 180 to the storage device, which may execute the SE operation.

In step 493, the system 100 may complete the erase procedure shown in FIG. 4.

Figure 5:
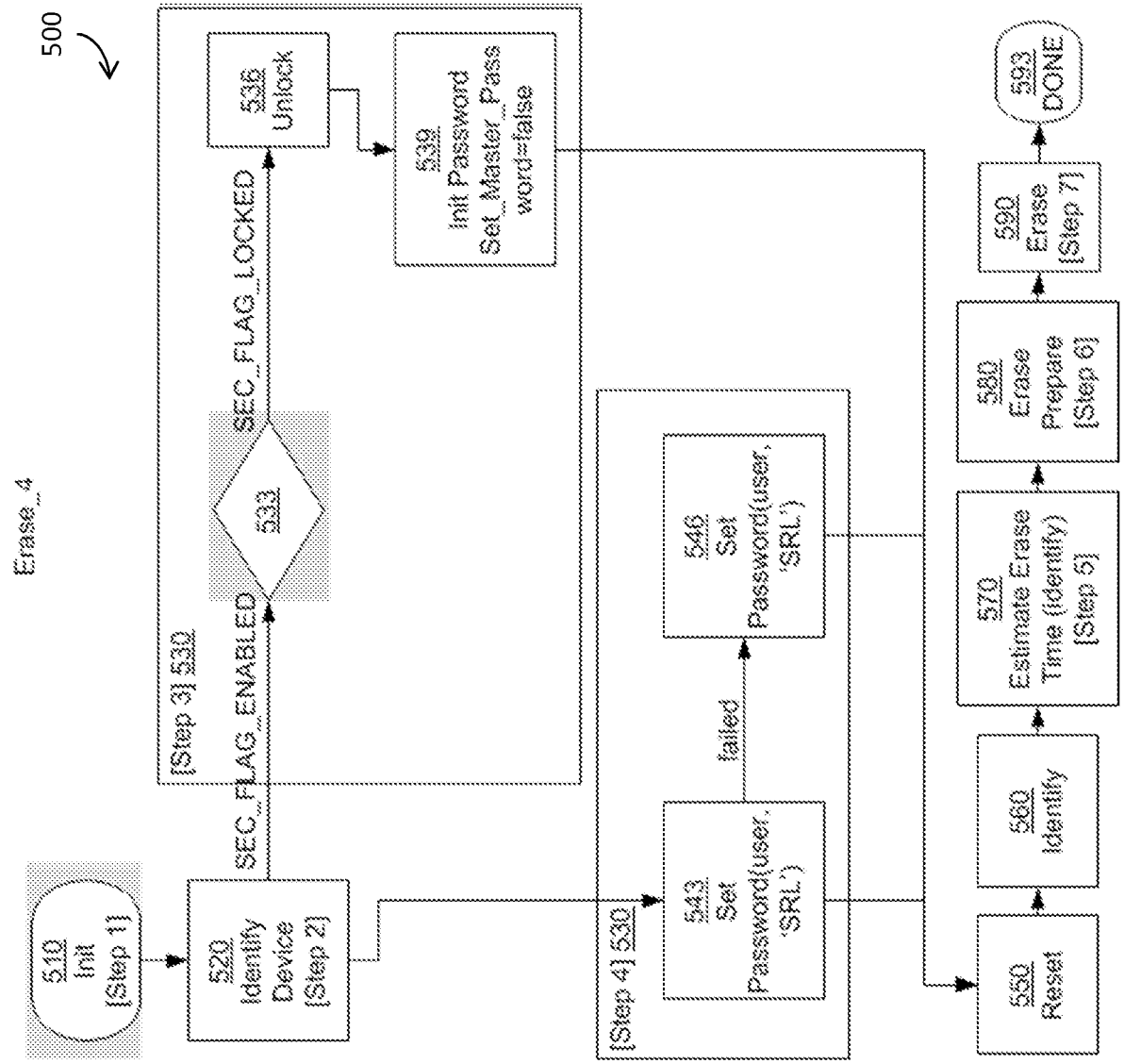
FIG. 5 is a flowchart of an additional exemplary technique that may be used in some embodiments.

FIG. 5 illustrates an exemplary technique that may be used in some embodiments for erasing a storage device using the system 100 (FIG. 1). It should be understood that the sequence of the steps described in connection with FIG. 5 may be altered and/or additional steps may be added.

In this embodiment, the erasure may be initiated by user input. Accordingly, using the user interface 135, the user may begin an erase procedure described in more detail below. The user may begin an erase procedure at step 510. For this, the user may install a storage device to be erased. Alternatively, the system 100 may be connected to the storage device in situ. At step 520, the system 100 may identify the storage device. In step 530, which may begin at step 533, if the SEC_FLAG_LOCKED condition is met, processing may proceed to step 536. Otherwise, processing may proceed to step 540. In step 536, the system 100 may unlock the storage device and processing may proceed to step 539. In step 539, processing may bypass setting of the master password and proceed to step 550.

In step 540, which may begin at step 543, the user may set the master password of the storage device using the user interface 135. If this fails, processing may proceed to step 546. In step 546, the user may set the master password of the storage device using the user interface 135.

In step 550, the system 100 may perform a hard reset of the storage device. In step 560, the system 100 may identify the storage device.

In step 570, the system 100 may estimate the erase time of the storage device. The system 100 may provide the estimated erase time to the user via the user interface 135 or any other suitable way. According to some embodiments, the user may select whether to proceed with the erase procedure or cancel it via the user interface 135.

In step 580, the system 100 may prepare for the SE operation. This preparation may include preventing access to the storage device and/or the bus while the SE operation executes, performing an erasure of the HPA and/or DCO, and/or performing a hard reset of the storage device.

In step 590, the system 100 may initiate the SE operation on the storage device. To do this, the eraser device 110 may send a SE signal over the bus 180 to the storage device, which may execute the SE operation.

In step 593, the system 100 may complete the erase procedure shown in FIG. 5.

The techniques illustrated in FIGS. 2-5 may be used alternatively or together. In some embodiments, one or more of the techniques illustrated in FIGS. 3-5 may be used as part of the processing illustrated in FIG. 2. As a specific non-limiting example, one of the techniques illustrated in FIGS. 3-5 may be selected to perform the erase operation in block 265 (FIG. 2). The techniques may be used in sequence until a successful erase is achieved or in any other suitable order.

Moreover, it should be appreciated that various operations are described in FIGS. 2-5. Some of these operations are common to more than one of the figures. To illustrate the generality of the approach described herein, similar operations may be described as being triggered or executed differently in connection with different ones of the figures. It should be appreciated that either the initiation or performance of an operation as described in connection with one of the figures may alternatively or additionally be used in connection with a similar operation illustrated in another figure.

Figure 6:
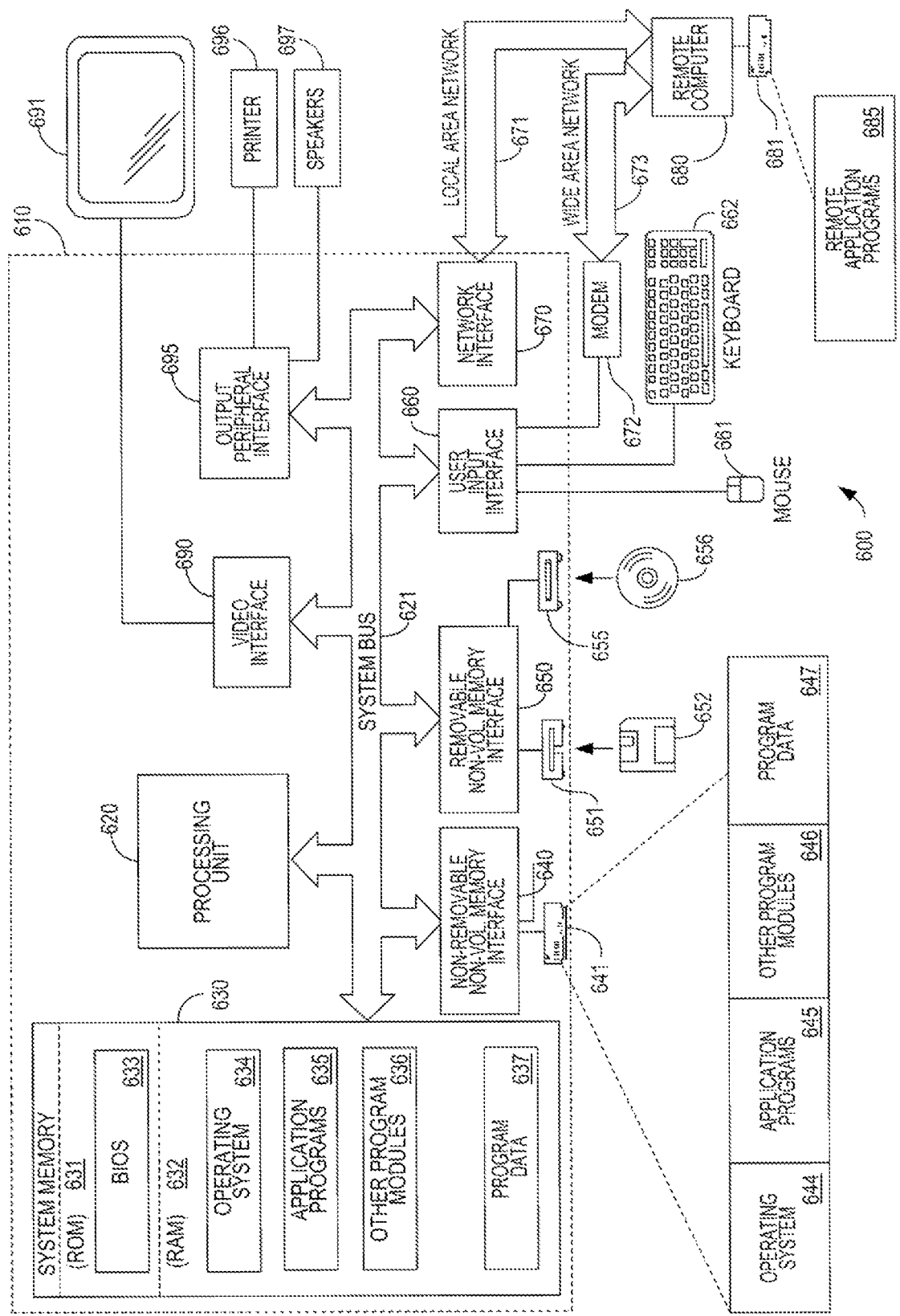
FIG. 6 illustrates an example of a computing system environment on which aspects of the invention may be implemented.

FIG. 6 illustrates an example of a suitable computing system environment 600 on which the invention may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 610. Computer 610, with programming or other modification to perform functions as described herein may be used to implement an eraser device 610. Though not shown in FIG. 6, such modifications may include modifications to include any functions attributed to PCB 170. Alternatively or additionally, computer 610, rather than being a dedicated eraser device, may be a computer that would, in normal operation, store or retrieve information from a storage device. In that scenario, computer 610 may be a user's computer programmed to erase a storage device using techniques as described herein.

Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, erasure of a storage device may entail acts in an order comprising erasing a host protected area and/or a device configuration overlay of the storage device; subsequently, performing a hard reset of the storage device, and subsequently, initiating a secure erase operation on the storage device. However, the hard reset may be before or after, or during different "tries" (when attempting) to effect an SE operation. Additionally, during secure erasure of an storage device, there may be a multiplicity of tries on the same area, with various combinations and orders of acts used to ensure erasure. Moreover, different combinations and orders of acts maybe sued for the different HPA, DCO and other areas of the hard drive.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

As should be appreciated, some embodiments may include a computer-readable storage medium encoded with computer-executable instructions that, when executed by a computer, cause the computer to carry out a method. The method may comprise identifying viable data erasure techniques; when a secure erase operation is supported, preparing to manage the secure erase operation; and sending a secure erase signal from an eraser device to a storage device to initiate the secure erase operation.

Further embodiments may include a computer-readable storage medium encoded with computer-executable instructions that, when executed by a computer, cause the computer to carry out a method of securely erasing a storage device. The method may comprise: erasing a host protected area and/or a device configuration overlay of the storage device; subsequently, performing a hard reset of the storage device, and subsequently, initiating a secure erase operation on the storage device.

Additional embodiments may include a method for completing a secure erase operation. The method may comprise: identifying viable data erasure techniques; when the secure erase operation is supported, preparing to manage the secure erase operation; and sending a secure erase signal from an eraser device to a storage device to initiate the secure erase operation.

According to some embodiments, the storage device may comprise solid state memory. Additionally, the storage device may further comprise magnetic disk memory. For example, the storage device may comprise a hybrid drive that combines solid state memory (e.g., NAND flash memory used as a cache for frequently used data) with magnetic hard disk memory, which may be called a solid state hybrid drive.

According to some embodiments, sending the secure erase signal may comprise sending the secure erase signal from the eraser device to the storage device over a bus. Additionally, the bus may be configured to connect the eraser device to the storage device. Furthermore, the bus may comprise a universal serial bus.

According to some embodiments, preparing to manage the secure erase operation may comprise, while the storage device executes the secure erase operation, preventing access to the storage device connected to the bus, and/or the bus.

Alternatively or additionally, preparing to manage the secure erase operation may comprise sending a hard reset signal to the storage device. Additionally, the hard reset signal may be configured to cause the storage device to reset and/or interrupt storage operations and/or internal state machines on the storage device.

Alternatively or additionally, preparing to manage the secure erase operation may comprise sending a hard reset signal to the storage device. Additionally, the hard reset signal may be configured to cause the storage device to cycle power on the storage device. Furthermore, preparing to manage the secure erase operation may further comprise, before sending the hard reset signal to the storage device, sending a hidden area erase signal to the storage device. Additionally, the hidden area erase signal may be configured to cause the storage device to erase a host protected area and/or a device configuration overlay of the storage device. Moreover, the hidden area erase signal may be configured to cause the storage device to erase the host protected area and/or the device configuration overlay of the storage device while preserving system area data of the storage device.

According to some embodiments, the secure erase signal may function at a hardware level of a storage device. The hardware level may be below an operating system level.

According to some embodiments, the eraser device may be configured to preserve data within the secure erase signal such that the data include instructions for the secure erase operation that remain unaltered by a basic input/output system of the eraser device.

According to some embodiments, the method may further comprise: after preparing to manage the secure erase operation and before sending the secure erase signal, sending a write signal to the storage device; after sending the secure erase signal and completion of the secure erase operation, sending a read signal to the storage device; and if the second data represent an erased state of the first data, providing feedback to a user indicating success of the secure erase operation. Additionally, the write signal may be configured to cause the storage device to write first data to locations on the storage device. Furthermore, the read signal may be configured to cause the storage device to read second data from the locations.

What is claimed is:

1. A computer-readable storage medium encoded with computer-executable instructions that, when executed by a computer, cause the computer to carry out a method of securely erasing a solid state storage device, the method comprising:
   identifying a storage device; and
   in response to identifying the storage device:
   reading a state of at least one security flag on the storage device;
   determining whether to send a signal to the storage device based on the state of the at least one security flag on the storage device;
   before sending a hard reset signal to the storage device, sending a hidden area erase signal to the storage device, the hidden area erase signal being configured to cause the storage device to erase a host protected area and/or a device configuration overlay of the storage device;
   subsequently to completing erasing of the host protected area and/or the device configuration overlay of the storage device and before writing signature data to the storage device, sending the hard reset signal to the storage device;
   subsequently to completing performing of a hard reset of the storage device and before initiating a secure erase operation on the storage device, writing the signature data to the storage device;
   subsequently to writing the signature data to the storage device, sending a secure erase signal from an eraser device to the storage device to initiate the secure erase operation, wherein the storage device comprises solid state memory;
   subsequently to completing the secure erase operation on the storage device, initiating repowering of the storage device; and
   subsequently to completing repowering of the storage device, checking for the signature data on the storage device.

2. The computer-readable storage medium of claim 1, wherein:
   the storage device further comprises magnetic disk memory.

3. The computer-readable storage medium of claim 1, wherein:
   sending the secure erase signal comprises sending the secure erase signal from the eraser device to the storage device over a bus, the bus being configured to connect the eraser device to the storage device.

4. The computer-readable storage medium of claim 3, wherein:
   the bus comprises a universal serial bus.

5. The computer-readable storage medium of claim 1, wherein:
   the method further comprises, in response to identifying the storage device:
   sending a hard reset signal to the storage device, the hard reset signal being configured to:
   cause the storage device to cycle power on the storage device,
   cause the storage device to reset, and/or
   interrupt storage operations and/or internal state machines on the storage device.

6. The computer-readable storage medium of claim 1, wherein:
   the hidden area erase signal is configured to cause the storage device to erase the host protected area and/or the device configuration overlay of the storage device while preserving system area data of the storage device.

7. The computer-readable storage medium of claim 1, wherein:
   the secure erase signal functions at a hardware level of a storage device, wherein the hardware level is below an operating system level.

8. The computer-readable storage medium of claim 1, wherein:
   the eraser device is configured to preserve data within the secure erase signal such that the data include instructions for the secure erase operation that remain unaltered by a basic input/output system of the eraser device.

9. The computer-readable storage medium of claim 1, the method further comprising:
   before sending the secure erase signal, sending a write signal to the storage device, the write signal being configured to cause the storage device to write first data to locations on the storage device;
   after sending the secure erase signal and completion of the secure erase operation, sending a read signal to the storage device, the read signal being configured to cause the storage device to read second data from the locations; and
   if the second data represent an erased state of the first data, providing feedback to a user indicating success of the secure erase operation.

10. A computer-readable storage medium encoded with computer-executable instructions that, when executed by a computer, cause the computer to carry out a method of securely erasing a storage device, the method comprising:
  initiating an erase procedure;
  based on the storage device being in a locked state, unlocking the storage device;
  erasing a host protected area and/or a device configuration overlay of the storage device before performing a hard reset of the storage device;
  subsequently to completing erasing of the host protected area and/or the device configuration overlay of the storage device and before writing signature data to the storage device, performing a hard reset of the storage device;
  subsequently to completing performing of the hard reset of the storage device and before initiating a secure erase operation on the storage device, writing the signature data to the storage device;
  subsequently to writing the signature data to the storage device, initiating the secure erase operation on the storage device;
  subsequently to completing the secure erase operation on the storage device, initiating repowering of the storage device; and
  subsequently to completing repowering of the storage device, checking for the signature data on the storage device.

11. The computer-readable storage medium of claim 10, wherein:
  erasing the host protected area and/or the device configuration overlay of the storage device comprises erasing the host protected area and/or the device configuration overlay of the storage device while preserving system area data of the storage device.

12. The computer-readable storage medium of claim 10, wherein:
  initiating the secure erase operation on the storage device comprises sending a secure erase signal over a bus to which the storage device is connected before preventing access to the bus.

13. A method of securely erasing a solid state storage device, the method comprising:
  identifying a storage device; and
  in response to identifying the storage device:
    reading a state of at least one security flag on the storage device;
    based on the state of the at least one security flag on the storage device, changing the at least one security flag on the storage device;
    sending a hidden area erase signal to the storage device and, subsequently to sending the hidden area erase signal and before writing signature data to the storage device, sending a hard reset signal to the storage device;
    subsequently to completing performing of a hard reset of the storage device and before initiating a secure erase operation on the storage device, writing the signature data to the storage device;
    subsequently to writing the signature data to the storage device, sending a secure erase signal from an eraser device to the storage device to initiate the secure erase operation, wherein the storage device comprises solid state memory;
    while the storage device executes the secure erase operation, preventing interruption of the secure erase operation;
    subsequently to completing the secure erase operation on the storage device, initiating repowering of the storage device; and
    subsequently to completing repowering of the storage device, checking for the signature data on the storage device.

14. The method of claim 13, wherein:
sending the secure erase signal comprises sending the secure erase signal from the eraser device to the storage device over a bus, the bus being configured to connect the eraser device to the storage device.

15. The method of claim 14, wherein:
the bus comprises a universal serial bus.

16. The method of claim 13, wherein:
the hard reset signal:
  causes the storage device to reset and/or
  interrupts storage operations and/or internal state machines on the storage device.

17. The method of claim 13, wherein:
the eraser device is configured to preserve data within the secure erase signal such that the data include instructions for the secure erase operation that remain unaltered by a basic input/output system of the eraser device.

* * * * *